United States Patent
Zhang et al.

(10) Patent No.: US 8,120,801 B2
(45) Date of Patent: Feb. 21, 2012

(54) PRINT JOB MANAGEMENT SYSTEM FOR MANAGING DISTURBANCES IN A PLURALITY OF PRINT JOBS

(75) Inventors: Zhenyu Zhang, Cambridge, MA (US); Sudhendu Rai, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1473 days.

(21) Appl. No.: 11/411,167

(22) Filed: Apr. 25, 2006

(65) Prior Publication Data

US 2007/0247659 A1 Oct. 25, 2007

(51) Int. Cl.
*G06F 3/12* (2006.01)
*G06F 15/16* (2006.01)

(52) U.S. Cl. ...... 358/1.15; 358/1.13; 358/1.14; 358/1.16; 358/1.17; 358/1.9; 358/1.6; 709/200; 709/203; 709/206; 709/207; 709/217; 709/231; 709/223; 709/225; 709/227; 709/228; 709/233; 709/236; 709/238; 709/250; 705/2; 705/3; 705/7; 705/8; 705/37; 705/79; 705/80; 705/7.13; 705/7.14; 705/7.25; 718/101; 718/102; 718/103; 718/104

(58) Field of Classification Search ........ 358/1.15, 358/1.13, 1.14, 1.16, 1.17, 1.9, 1.6; 718/102, 718/103, 104; 700/97, 100, 101, 108, 122
See application file for complete search history.

(56) References Cited

U.S. PATENT DOCUMENTS

| | | | |
|---|---|---|---|
| 5,095,369 A * | 3/1992 | Ortiz et al. | 358/296 |
| 6,631,305 B2 | 10/2003 | Newmark | |
| 6,805,502 B2 | 10/2004 | Rai et al. | |
| 6,961,732 B2 | 11/2005 | Hellemann et al. | |
| 2002/0071134 A1 | 6/2002 | Jackson et al. | |
| 2002/0129081 A1 * | 9/2002 | Rai et al. | 709/102 |
| 2005/0065830 A1 | 3/2005 | Rai et al. | |
| 2005/0275875 A1 * | 12/2005 | Jennings, Jr. | 358/1.15 |
| 2007/0247657 A1 * | 10/2007 | Zhang et al. | 358/1.15 |

* cited by examiner

*Primary Examiner* — Steven Kau
(74) *Attorney, Agent, or Firm* — Pepper Hamilton LLP

(57) ABSTRACT

A method is provided for managing the scheduling of a plurality of print jobs for a print shop. The method includes obtaining a print job input stream including the plurality of print jobs. Each of the plurality of print jobs is scheduled for processing unless at least one of the plurality of print jobs is determined to be a disturbance job, the disturbance job causing delays in processing of other print jobs in the plurality of print jobs that would not occur but for the existence of the disturbance job in the print job input stream. The disturbance job is then assigned a processing related value that increases over time, and scheduling of the disturbance job is delayed until the processing related value exceeds a selected threshold value.

19 Claims, 15 Drawing Sheets

|  |  | Without disturbance | With disturbance but no hedge control | Hedge ratio threshold ||||||||||
|---|---|---|---|---|---|---|---|---|---|---|---|---|---|
|  |  |  |  | 5 | 6 | 8 | 10 | 12 | 15 | 20 | 25 | 30 | 40 | 55 |
| Release Hedge ratio | Mean | 2.42 | 12.97 | 2.66 | 2.75 | 2.93 | 3.11 | 3.29 | 3.57 | 4.02 | 4.47 | 4.93 | 5.84 | 7.2 |
|  | CV | 0.46 | 3.17 | 0.49 | 0.54 | 0.66 | 0.79 | 0.91 | 1.07 | 1.3 | 1.49 | 1.65 | 1.89 | 2.14 |
| Release Due slack | Mean | 0.2 | 0.3 | 0.17 | 0.19 | 0.191 | 0.193 | 0.196 | 0.2 | 0.21 | 0.21 | 0.22 | 0.23 | 0.25 |
|  | CV | 0.13 | 1.07 | 0.24 | 0.22 | 0.19 | 0.17 | 0.168 | 0.18 | 0.25 | 0.32 | 0.41 | 0.58 | 0.8 |

FIG. 15

PRINT JOB MANAGEMENT SYSTEM FOR MANAGING DISTURBANCES IN A PLURALITY OF PRINT JOBS

Cross-reference is made to co-pending, commonly assigned applications, U.S. application Ser. No. 11/410,833, filed Apr. 25, 2006, by Zhang et al., each entitled Print Job Management System.

BACKGROUND AND SUMMARY

The disclosed embodiments relate generally to document job management capability and, at least in one embodiment, to a system for managing "disturbance" in a plurality of print jobs.

Conventional print shops typically are organized in a fashion so that related equipment is grouped together. For example, printing equipment may be grouped and located together, while finishing equipment may be grouped and located in another location. Thus, the print shop may be set up to have a printing department, a finishing department, and other departments corresponding to the type of process or operation that is performed within that department. The organization of a print shop is typically often independent of print job complexity, print job mix and total volume of print jobs.

When a new print job arrives, the print job sequentially passes through each department until the print job is completed. The conventional approach leads to significant time delays and increased work-in-progress and inventory costs.

Various improvements for print shop operation have been proposed, several of which have been published as:

U.S. Patent Publication 20020071134 to Jackson et al. Published on Jun. 13, 2002 Entitled, System and Method for Converting Print Jobs Stored in Print shop Job Description Language Files into Print shop Workflow U.S. Patent Publication 20020129081 to Rai et al. Published on Sep. 12, 2002 Entitled, Production Server Architecture and Methods for Automated Control of Production Document Management U.S. Patent Publication 20050065830 to Rai et al. Published on Mar. 24, 2005 Entitled, A System and Method for The Acquisition and Analysis of Data for Print Shop Performance Evaluation and Adjustment U.S. Pat. No. 6,805,502, to Rai et al. discloses an approach for dividing a print job into sub-jobs or "batches." The batches are separately processed so as to improve the total turnaround time that is required to complete the processing of the print job. The patent describes methods for selecting a batch size for batches so as to reduce the total turnaround time for the print job.

The respective pertinent portions of all of the above-cited publications are incorporated herein by reference.

In document production (as well as a significant number of other types of production), it is common to receive job orders with small size but relatively large due slack (=due time (for job completion)−arrival time). Although these jobs (hereinafter referred to as "disturbance jobs") have relatively small initial takt-rates (Takt-rate=job size/due slack), and tend to only increase the total job workload a small amount, the demand disturbance caused by these jobs can result in a drastic change in the number of late jobs. It would be desirable to provide a technique for managing demand disturbance so as to improve on-time percentage for the total job workload.

In accordance with one aspect of the disclosed embodiments, there is provided a system for managing a scheduling of a plurality of print jobs for a print shop, including: a memory for buffering the plurality of print jobs; a scheduling system, communicating with said memory, for, (a) scheduling each of the plurality of print jobs for processing unless at least one of the plurality of print jobs is determined to be a disturbance job, the at least one disturbance job causing delays in processing of other print jobs in the plurality of jobs that would not occur but for the existence of the at least one disturbance job among the plurality of print jobs, and (b) assigning a print job processing related value to the at least one disturbance job, the print job processing related value increasing over time; and a filter for causing the scheduling of the at least one disturbance job to be delayed until the print job processing related value exceeds a selected threshold value In accordance with another aspect of the disclosed embodiments, there is provided a system for managing a scheduling of a plurality of document jobs in a document production environment, including: a memory for buffering the plurality of document jobs; a scheduling system, said scheduling system, (a) scheduling each of the plurality of document jobs for processing unless at least one of the plurality of document jobs is determined to be a disturbance job, the at least one disturbance job causing delays in processing of other document jobs in the plurality of jobs that would not occur but for the existence of the at least one disturbance job among the plurality of document jobs, and (b) assigning a document job processing related value to the at least one disturbance job, the document job processing related value increasing over time, and (c) delaying scheduling of the at least one disturbance job until the processing related value exceeds a selected threshold value.

In accordance with yet another aspect of the disclosed embodiments, there is provided a method for managing the scheduling of a plurality of jobs, including: obtaining a job input stream including the plurality of jobs; scheduling each of the plurality of jobs for processing unless at least one of the plurality of jobs is determined to be a disturbance job, the at least one disturbance job causing delays in processing of other jobs in the plurality of jobs that would not occur but for the existence of the at least one disturbance job in the job input stream; assigning a processing related value to the at least one disturbance job, the processing related value increasing over time; and delaying scheduling of the at least one disturbance job until the processing related value exceeds a selected threshold value.

BRIEF DESCRIPTION OF THE DRAWINGS

FIG. 15 is a table comparing different scenarios in which hedge ratio thresholds are compared with release time slack and release hedge ratio statistics;

DESCRIPTION OF EMBODIMENTS

Figure 1:
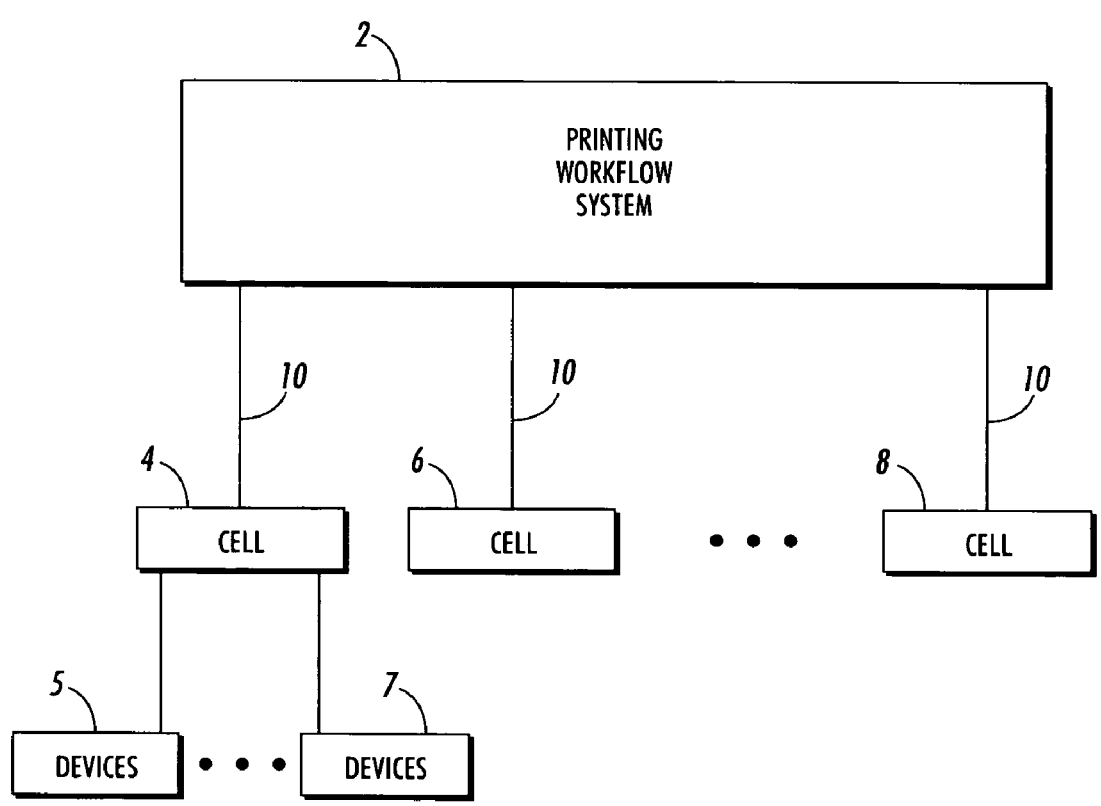
FIG. 1 is a diagrammatic illustration of a production workflow system (such as a document production workflow system) in combination with cells and their corresponding devices.

Referring now in detail to the drawings, wherein the parts are designated by the reference numerals throughout, FIGS. 1-17 correspond with an illustrative embodiment of a document workflow system and a method for assigning sub-jobs to various cells in the printing workflow system. Although the disclosed embodiments are described with reference to exemplary embodiments illustrated in the drawings, it should be understood that the claimed invention could be embodied in many alternative forms.

FIG. 1 illustrates a printing workflow system 2 in a print shop (or, more generally, a document factory). The printing workflow system 2 controls a multitude of cells 4, 6, 8. The printing workflow system 2 sends information to and receives information from the cells 4, 6, 8 via the communication links 10. The cells 4, 6, 8 are comprised of at least one device 5 for assisting in completing a document processing job of given product-types. For example, printing device 5 can be a laser printer 600 dpi and printing device 7 can be a color printer 1200 dpi.

Figure 2:
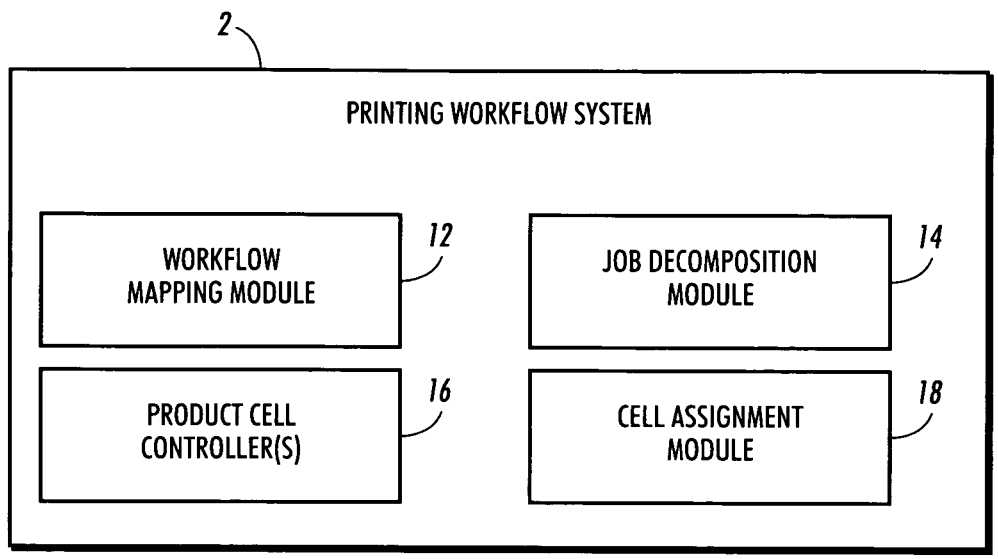
FIG. 2 is a diagrammatic illustration of software components employed in the production workflow system of FIG. 1.
Figure 3:
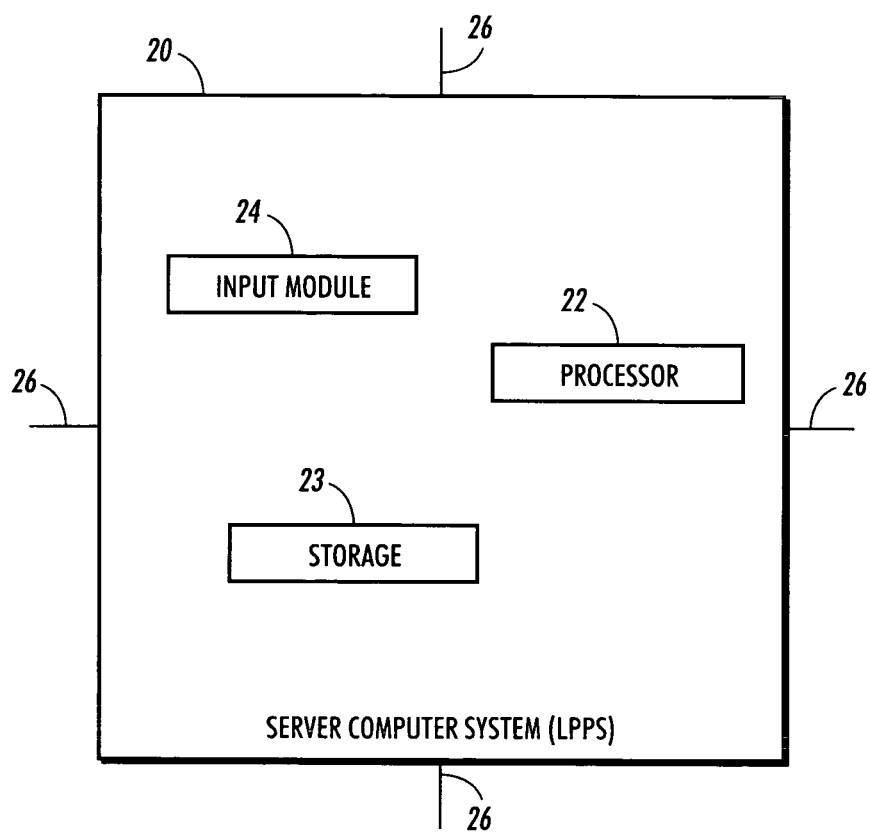
FIG. 3 is an illustration of a server employed in the production workflow system.

FIG. 2 illustrates several of the software modules employed in the printing workflow system 2. The printing workflow system 2 includes a workflow-mapping module 12 that determines the workflow for selected document processing jobs. As will be described in more detail below, the workflow identifies the operational steps needed to complete a document-processing job. The workflow also identifies the sequence of these operational steps. A job decomposition module 14 is included for splitting the document processing jobs into sub-jobs and for sending the sub-jobs to cells for completion. A product cell controller (PCC) 16 may be provided at given cells for receiving at least one sub-job to further split the sub-job to be processed by a printing device in the cell. Lastly, a cell assignment module 18 is provided for assigning sub-jobs to be processed by a cell.

In general, a print job is received and a workflow for it is developed by the workflow mapping module 12. The job decomposition module may split the job into sub-jobs. The sub-jobs or job are then assigned to cells for completion by the cell assignment module 18. The sub-jobs may be sent to product cell controller 16 of the assigned cells, where each sub-job may be further sub divided.

Figure 4:
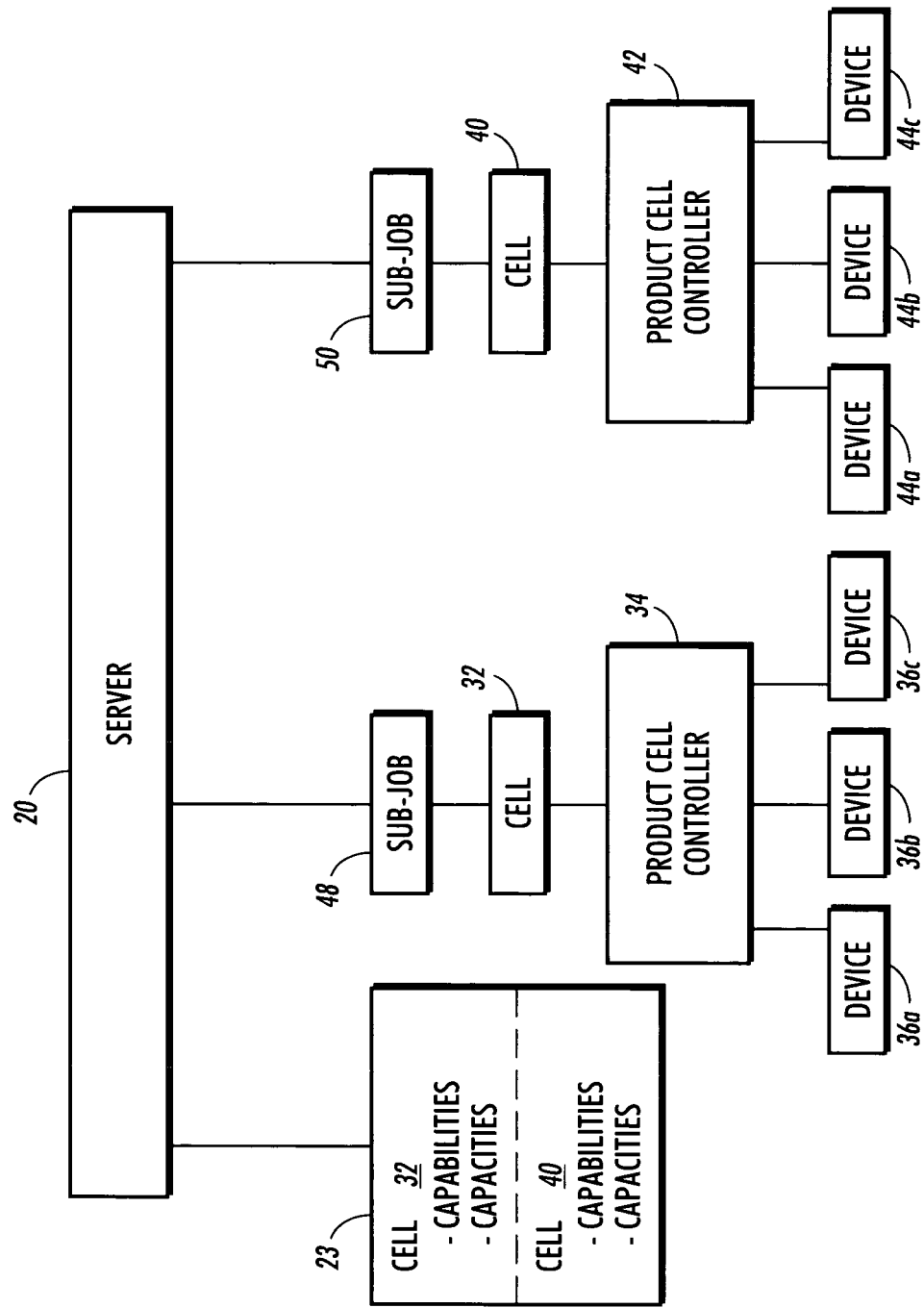
FIG. 4 illustrates the splitting of a document processing job into sub-jobs in one illustrative embodiment.

FIG. 4 illustrates a server computer system 20 (i.e., LPPS) which is suitable for use in the printing workflow system 2. The server 20 includes a processor 22, storage 23, communication links 26, and an input module 24. The input module 24 is used to receive input from various devices via the communications links 26. The input module 24 receives the document processing jobs on behalf of the server 20. The processor 22 executes the programming instructions on the server 20 to manage document processing jobs. The server 20 stores the instructions in the storage 23. For example, modules 12, 14, and 18 and other data are stored in storage 23. Module 16 may be executed on a separate server that is particular to a cell.

FIG. 4 illustrates the printing workflow system 2 interacting with a cell in a network provided in a print server. The product cell controller 34 for the cell receives a sub-job 48 from the server 20 to be further processed by the cell. The server 20 stores in its storage 23 the capacities and capabilities of each cell in the print shop to produce different product-types. For example, cell 32 in the network produces three different types of documents and cell 40 produces two types of documents. (It is quite possible that two different cells can produce similar, or even the same, document types. A document type is uniquely characterized by the sequence of processing steps to completely finish the document). The server 20 stores this information to determine which cell has the capabilities to process a document job. The printing workflow system 23 also stores the capacity of each cell to determine the volume of a particular product-type that a cell can produce. As stated above, the job decomposition module 14 splits a document processing job into sub-jobs to be sent to various autonomous cells for processing. The cells in the network are autonomous and can produce their respective product entirely by themselves. Thus, in the example shown in FIG. 4, a document processing job is split into sub-jobs 48 and 50 that are sent to cells 32 and 40, respectively. The product cell controllers 34 and 42 send the sub-jobs 48 and 50 to devices 36a, 36b, 36c and 44a, 44b, 44c in the respective cells 32 and 40 for processing.

Figure 5:
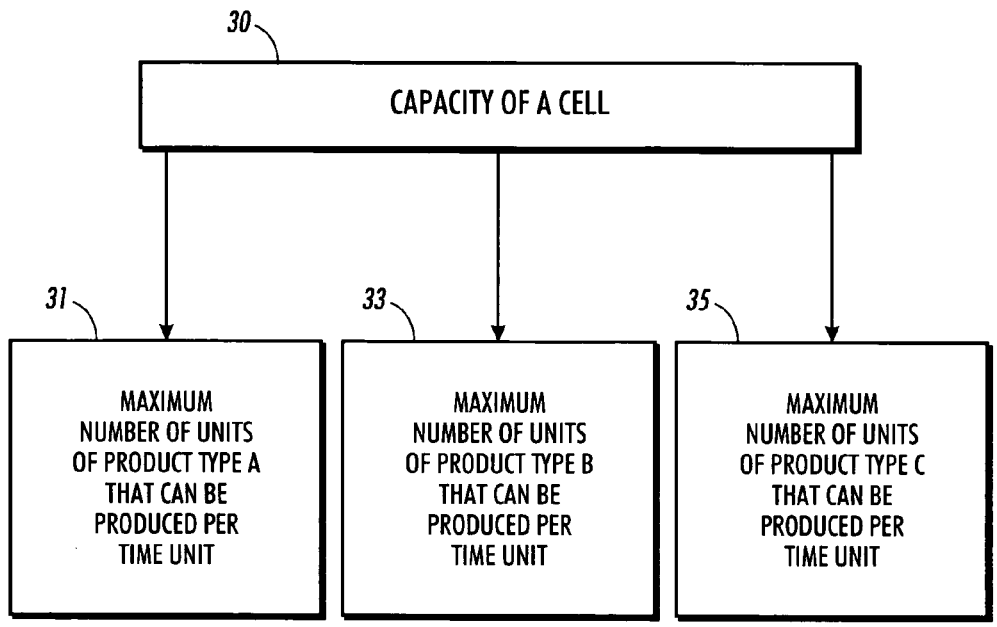
FIG. 5 is an illustration of a capacity of a cell.

FIG. 5 illustrates an example of how capacity is defined for a cell in the illustrative embodiment. As stated above, the printing workflow system 2 stores the capacity of each cell. "Capacity" is the maximum volume of a particular product type that the cell can produce for a time period. For example, FIG. 5 shows capacities for 31, 33, and 35 three different product types (Product A, Product B, and Product C). The printing workflow system 2 updates the capacities and makes it easier to determine which cells should be assigned a sub-job. Capabilities are used to determine the assignment for a cell to process a sub-job.

Figure 6:
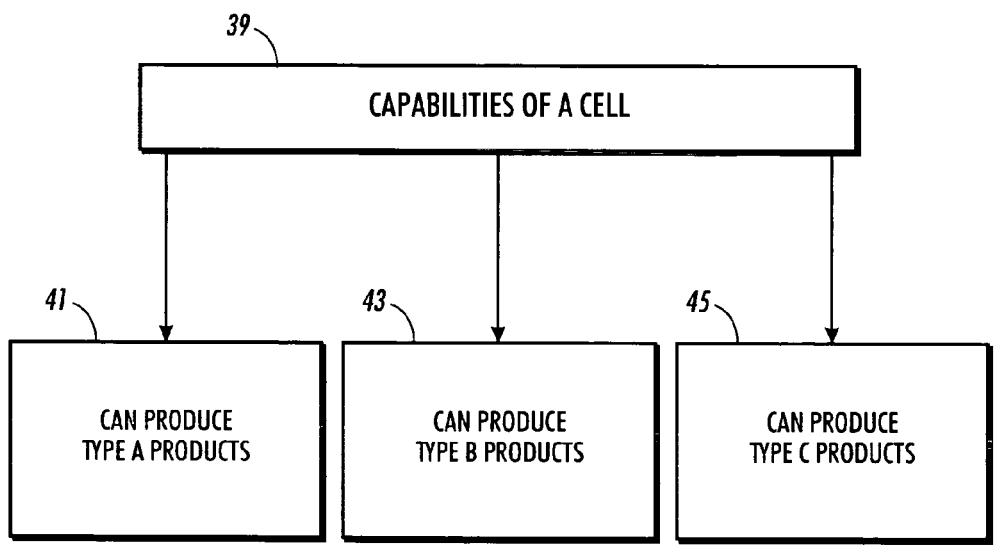
FIG. 6 is an illustration of capabilities of a cell.

Referring to FIGS. 4 and 6, an example of the capabilities 39 stored for a cell 32 is provided. Cell 32 is capable of processing various document product-types A, B, C. Hence, capabilities 41, 43, and 45 are stored for cell 32. For example, if a user has a document of product-type D, then cell 32 would not be the choice to accomplish the processing of the document because the cell 32 does not support such a capability. The printing workflow system 2, stores the capabilities for each cell in the print shop. This allows the cell assignment module 18 to examine the capacities and capabilities of the cells to determine which cell to assign a particular sub-job.

Figure 7:
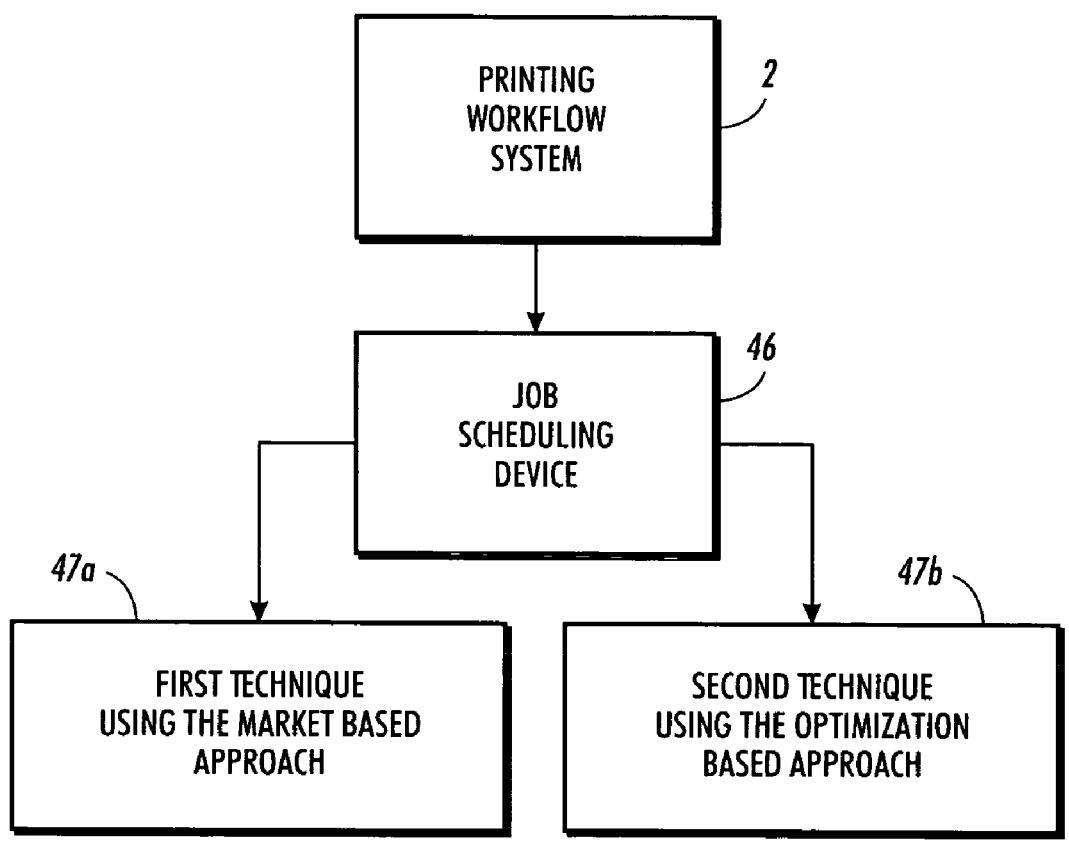
FIG. 7 is an illustration of a job scheduling device.

FIG. 7 illustrates a flow diagram of a job scheduling system described in U.S. patent application Ser. No. 11/254,501 to Lin et al. [U.S. Publication No. 2007/0092323]. Once a document processing job is prepared for processing, the job scheduling system 46 determines which one of several techniques for routing and scheduling document processing jobs should be used. A first technique 47a uses a market-based approach for scheduling a document processing job, while second technique 47b uses an optimization based approach for scheduling the document processing job. Detailed description of these first and second techniques is provided in U.S. patent application Ser. No. 11/254,501 to Lin et al. [U.S. Publication No. 2007/0092323], the pertinent portions of which are incorporated herein by reference.

The embodiments described below relate to an efficient approach for recognizing disturbances in demand due to relatively small size jobs with relatively large due slack. In one example, a new control policy, namely hedge ratio based control, is used to filter disturbance and correctly schedule these small takt-rate jobs. In another example, a takt-rate based control may be used to filter disturbance. Either hedge ratio or takt-rate based control policy, together with a suitable scheduling rule, such as a shortest-remaining-processing-time (SRPT) rule, can be used to effectively improve the on-time performance in a document production environment with high utilization, small time slack and demand disturbance.

In a number of aspects or embodiments of the present disclosure, the following equations are provided as they for example, especially relate to the relationships of "due slack," of "takt rate," of "hedge ratio," and of the relationship between hedge ratio and takt rate. This disclosure contemplates additional relationships, similar to those recited herein, relationships derived therefrom, obvious relationships thereof, known suitable relationships, and the like, such as those equations that permit the present disclosure to achieve the intended result or results.

| Due slack | |
|---|---|
| Instantaneous due slack | $s(t) = $ due time − current time $= t_D - t$ |
| Initial due slack | $s(t_0) = $ due time − arrival time $= t_D - t_0$ |
| Release due slack | $s(t_r) = $ due time − dispatch time $= t_D - t_r$ |

Where,
  t: Current time
  $t_D$: Due time
  $t_0$: Arrival time
  $t_r$: Release time
Also note that due slack is determined relative to a "reference time," e.g., current time or arrival time)
(In one exemplary approach, jobs in a queue are scheduled using certain rules. Release time represents the time when a job arrives at the job queue, and arrival time represents the time when a job arrives at a hedge controller, "upstream" of the job queue. As will appear from the description below, without hedging, release time and arrival time are equivalent. When there is no hedging, any arrived job entering the job queue is scheduled immediately. With hedging, release time≧arrival time, and jobs will wait at the hedge controller. After passing the hedge ratio controller, a given job will be scheduled with other jobs in the job queue.)

| Takt rate | |
|---|---|
| Initial takt rate | $r(t_0) = $ job size/initial due slack $= N/s(t_0)$ |
| Instantaneous takt rate | $r(t) = $ job size/instantaneous due slack $= N/s(t)$ |
| Release takt rate | $r(t_r) = $ job size/instantaneous due slack $= N/s(t_r)$ |

Where
  N: job size

| | |
|---|---|
| Instantaneous hedge ratio | $h(t) = $ instantaneous due slack/(job size/speed) $= s(t)/(N/u) = s(t) u/N$ |
| Initial hedge ratio | $h(t_0) = $ initial due slack/(job size/speed) $= s(t_0)/(N/u) = s(t_0) u/N$ |
| Release hedge ratio | $h(t_r) = $ instantaneous due slack/(job size/speed) $= s(t_r)/(N/u) = u\, s(t_r)/N$ |

Where
  u: machine speed

Relationship Between Hedge Ratio and Takt Rate
Initial hedge ratio=speed/initial takt rate
Instantaneous hedge ratio=speed/Instantaneous takt rate Several aspects of the disclosed embodiments are illustrated in three parts below:
  I. Problems caused by small takt-rate job disturbance;
  II. Efficient method for diagnosing the job disturbance; and
  III. Hedge ratio control and its impact on job disturbance.

Part I: In operation of a print shop, or other factory type facility, operation at relatively high "utilization" and/or tight "due slack" is expected. As disclosed in U.S. Pat. No. 6,631,305 to Newmark, the pertinent portions of which are incorporated herein by reference, a given job size distribution may be expressed in terms of "takt-time." As indicated in the '305 patent, takt-time or "takt-rate is the rate in time that a factory must maintain to meet customer demand, and is a useful parameter in analyzing the performance of an assembly line. Additionally, the term "utilization" refers to the ratio of used capacity to available capacity.

In the analysis of demand variability and control policy, a shortest-remaining-processing-time (SRPT) rule has been demonstrated as being effective, among scheduling rules (such as the "earliest-due-date," or "least time slack" rule), in use with the disclosed scheduling related embodiments. Accordingly, results obtained with the SRPT rule are used as the baseline for illustrating the problem(s) and improvement(s) addressed by the present description. It will be understood, however, that the possible effective use of other scheduling rules is contemplated by the disclosed embodiments.

To demonstrate disturbance in demand, a small case involving 33 jobs is examined. Data is obtained from a simulation with the following constraints:
  The job inter-arrival mean is 0.15 hr/job, and job inter-arrival coefficient of variation (CV) 1.3;
  The job size mean is 850 pages/hr, and job size CV is 0.6;
  The initial due slack mean is 0.3 hr, and initial due slack CV is 1.09 (this is large because of the large initial due slack of demand disturbance);
  Process speed is 9000 pages/hr; and
  Since demand is very volatile, the utilization is set as only 62%.

Results from the simulation using SRPT rule are shown in Table 1 immediately below:

TABLE 1

Job data with disturbance from small takt-rate jobs

| ID | Job Size | Arrival Time | Initial Due Slack | Processing Time | Due Date | Initial Takt Rate |
|---|---|---|---|---|---|---|
| 1 | 754.45 | 0.00 | 0.16 | 0.08 | 0.16 | 4735.10 |
| 2 | 510.29 | 0.07 | 0.18 | 0.06 | 0.25 | 2859.78 |

TABLE 1-continued

Job data with disturbance from small takt-rate jobs

| ID | Job Size | Arrival Time | Initial Due Slack | Processing Time | Due Date | Initial Takt Rate |
|---|---|---|---|---|---|---|
| 3 | 527.24 | 0.11 | 0.20 | 0.06 | 0.32 | 2591.12 |
| 4 | 55.80 | 0.36 | 1.40 | 0.01 | 1.76 | 39.83 |
| 5 | 2241.14 | 0.37 | 0.25 | 0.25 | 0.62 | 8988.41 |
| 6 | 1434.18 | 0.42 | 0.22 | 0.16 | 0.64 | 6652.95 |
| 7 | 805.65 | 1.55 | 0.19 | 0.09 | 1.74 | 4192.47 |
| 8 | 527.47 | 1.75 | 0.19 | 0.06 | 1.94 | 2765.44 |
| 9 | 467.11 | 1.95 | 0.20 | 0.05 | 2.15 | 2318.26 |
| 10 | 948.52 | 2.03 | 0.19 | 0.11 | 2.22 | 5049.40 |
| 11 | 1866.54 | 2.10 | 0.25 | 0.21 | 2.35 | 7614.66 |
| 12 | 1054.66 | 2.28 | 0.22 | 0.12 | 2.50 | 4849.39 |
| 13 | 317.99 | 2.43 | 0.16 | 0.04 | 2.59 | 1982.42 |
| 14 | 545.67 | 2.81 | 0.17 | 0.06 | 2.98 | 3125.46 |
| 15 | 163.08 | 2.86 | 1.30 | 0.02 | 4.16 | 125.45 |
| 16 | 1808.05 | 2.88 | 0.22 | 0.20 | 3.10 | 8221.49 |
| 17 | 559.76 | 2.91 | 0.25 | 0.06 | 3.16 | 2273.57 |
| 18 | 965.88 | 3.38 | 0.18 | 0.11 | 3.56 | 5344.33 |
| 19 | 1186.09 | 3.43 | 0.23 | 0.13 | 3.67 | 5091.92 |
| 20 | 298.54 | 3.51 | 0.15 | 0.03 | 3.66 | 2008.61 |
| 21 | 679.41 | 3.67 | 0.18 | 0.08 | 3.85 | 3843.99 |
| 22 | 762.22 | 3.81 | 0.19 | 0.08 | 4.00 | 3959.33 |
| 23 | 1259.57 | 3.88 | 0.20 | 0.14 | 4.07 | 6412.14 |
| 24 | 1057.84 | 3.95 | 0.22 | 0.12 | 4.17 | 4912.36 |
| 25 | 1411.61 | 4.05 | 0.20 | 0.16 | 4.26 | 6968.96 |
| 26 | 615.61 | 4.14 | 0.19 | 0.07 | 4.33 | 3196.35 |
| 27 | 543.20 | 4.26 | 0.20 | 0.06 | 4.46 | 2688.05 |
| 28 | 1406.21 | 4.63 | 0.18 | 0.16 | 4.81 | 7653.23 |
| 29 | 601.34 | 4.77 | 0.18 | 0.07 | 4.94 | 3430.73 |
| 30 | 171.78 | 4.96 | 1.10 | 0.02 | 6.06 | 156.16 |
| 31 | 1717.79 | 4.96 | 0.20 | 0.19 | 5.16 | 8650.08 |
| 32 | 410.53 | 5.00 | 0.20 | 0.05 | 5.20 | 2059.37 |
| 33 | 674.24 | 5.07 | 0.21 | 0.07 | 5.28 | 3268.72 |

Three jobs in Table 1 (#4, #15, and #30), each having a small takt-rate, are designated as the "disturbance jobs." The takt-rate for each one of the disturbance jobs is less than 10% of the average value for all of the jobs (4283 pages/hr), and the size for each disturbance job is smaller than 20% of the average job (873 pages/job). The total size of these small jobs accounts for only 1.4% of the total workload. The simulation results obtained in scheduling the jobs of Table 1 with the SRPT rule are shown in the following Table 2:

TABLE 2

Simulation results using SRPT scheduling

| Job ID | Arrival Time | Process Time | Due Slack | Due Time | Start Time | Finish Time | Earliness |
|---|---|---|---|---|---|---|---|
| 1 | 0 | 0.08383 | 0.159332 | 0.15933 | 0 | 0.08383 | 0.0755 |
| 2 | 0.07014 | 0.0567 | 0.178436 | 0.24857 | 0.08383 | 0.14053 | 0.10805 |
| 3 | 0.1136 | 0.05858 | 0.203478 | 0.31708 | 0.14053 | 0.19911 | 0.11797 |
| 4 | 0.3601 | 0.0062 | 1.401 | 1.7611 | 0.3601 | 0.3663 | 1.3948 |
| 5 | 0.36786 | 0.24902 | 0.249337 | 0.6172 | 0.36786 | 0.61688 | 0.00032 |
| 6 | 0.41958 | 0.15935 | 0.21557 | 0.63515 | 0.61688 | 0.77623 | −0.1411 |
| 7 | 1.54659 | 0.08952 | 0.192167 | 1.73876 | 1.54659 | 1.63611 | 0.10265 |
| 8 | 1.75339 | 0.05861 | 0.190738 | 1.94413 | 1.75339 | 1.812 | 0.13213 |
| 9 | 1.95264 | 0.0519 | 0.201493 | 2.15413 | 1.95264 | 2.00454 | 0.14959 |
| 10 | 2.03117 | 0.10539 | 0.187848 | 2.21902 | 2.03117 | 2.13656 | 0.08246 |
| 11 | 2.10341 | 0.20739 | 0.245124 | 2.34853 | 2.13656 | 2.34395 | 0.00458 |
| 12 | 2.28185 | 0.11718 | 0.217482 | 2.49933 | 2.34395 | 2.46114 | 0.03819 |
| 13 | 2.43318 | 0.03533 | 0.160407 | 2.59359 | 2.46114 | 2.49647 | 0.09712 |
| 14 | 2.807 | 0.06063 | 0.17459 | 2.98159 | 2.807 | 2.86763 | 0.11396 |
| 15 | 2.8603 | 0.01812 | 1.3 | 4.1603 | 2.86763 | 2.88575 | 1.27455 |
| 16 | 2.87996 | 0.20089 | 0.219917 | 3.09988 | 2.88575 | 3.08664 | 0.01323 |
| 17 | 2.91143 | 0.0622 | 0.246203 | 3.15763 | 3.08664 | 3.14884 | 0.00879 |
| 18 | 3.37541 | 0.10732 | 0.18073 | 3.55614 | 3.37541 | 3.48273 | 0.07341 |
| 19 | 3.43282 | 0.13179 | 0.232936 | 3.66576 | 3.48273 | 3.61452 | 0.05124 |
| 20 | 3.51255 | 0.03317 | 0.14863 | 3.66118 | 3.61452 | 3.64769 | 0.01349 |
| 21 | 3.66908 | 0.07549 | 0.176745 | 3.84583 | 3.66908 | 3.74457 | 0.10126 |
| 22 | 3.80583 | 0.08469 | 0.192513 | 3.99834 | 3.80583 | 3.89052 | 0.10782 |
| 23 | 3.87712 | 0.13995 | 0.196435 | 4.07355 | 3.89052 | 4.03047 | 0.04308 |
| 24 | 3.95318 | 0.11754 | 0.215343 | 4.16852 | 4.03047 | 4.14801 | 0.02051 |
| 26 | 4.13844 | 0.0684 | 0.192599 | 4.33104 | 4.14801 | 4.21641 | 0.11463 |
| 25 | 4.05465 | 0.15685 | 0.202556 | 4.25721 | 4.21641 | 4.37326 | −0.1161 |
| 27 | 4.26115 | 0.06036 | 0.20208 | 4.46323 | 4.37326 | 4.43361 | 0.02962 |
| 28 | 4.6251 | 0.15625 | 0.18374 | 4.80884 | 4.6251 | 4.78135 | 0.0275 |
| 29 | 4.76862 | 0.06682 | 0.175279 | 4.9439 | 4.78135 | 4.84816 | 0.09574 |
| 30 | 4.96 | 0.01909 | 1.1 | 6.06 | 4.96 | 4.97909 | 1.08091 |
| 31 | 4.96328 | 0.19087 | 0.198587 | 5.16187 | 4.97909 | 5.16995 | −0.0081 |
| 32 | 5.00169 | 0.04561 | 0.199347 | 5.20104 | 5.16995 | 5.21557 | −0.0145 |
| 33 | 5.07237 | 0.07492 | 0.206271 | 5.27864 | 5.21557 | 5.29048 | −0.0118 |

It should be noted that each job is assigned an "earliness" value, with a positive earliness value reflecting that a job has been performed on time and a negative earliness value indicating that a job has been performed late. In accordance with this earliness criterion, five jobs, namely #6, #25, #31, #32 and #33, are late; thus causing the on-time percentage for the simulation to be 83%. If the simulation is performed without the presence of the disturbance, the on-time percentage improves to 93%. In summary, the presence of three jobs comprising only 1.3% of the workload causes a 10% decrease in on-time percentages. Therefore, even a small amount of disturbance in workload can lead to a significant loss in on-time percentage.

Figure 8:
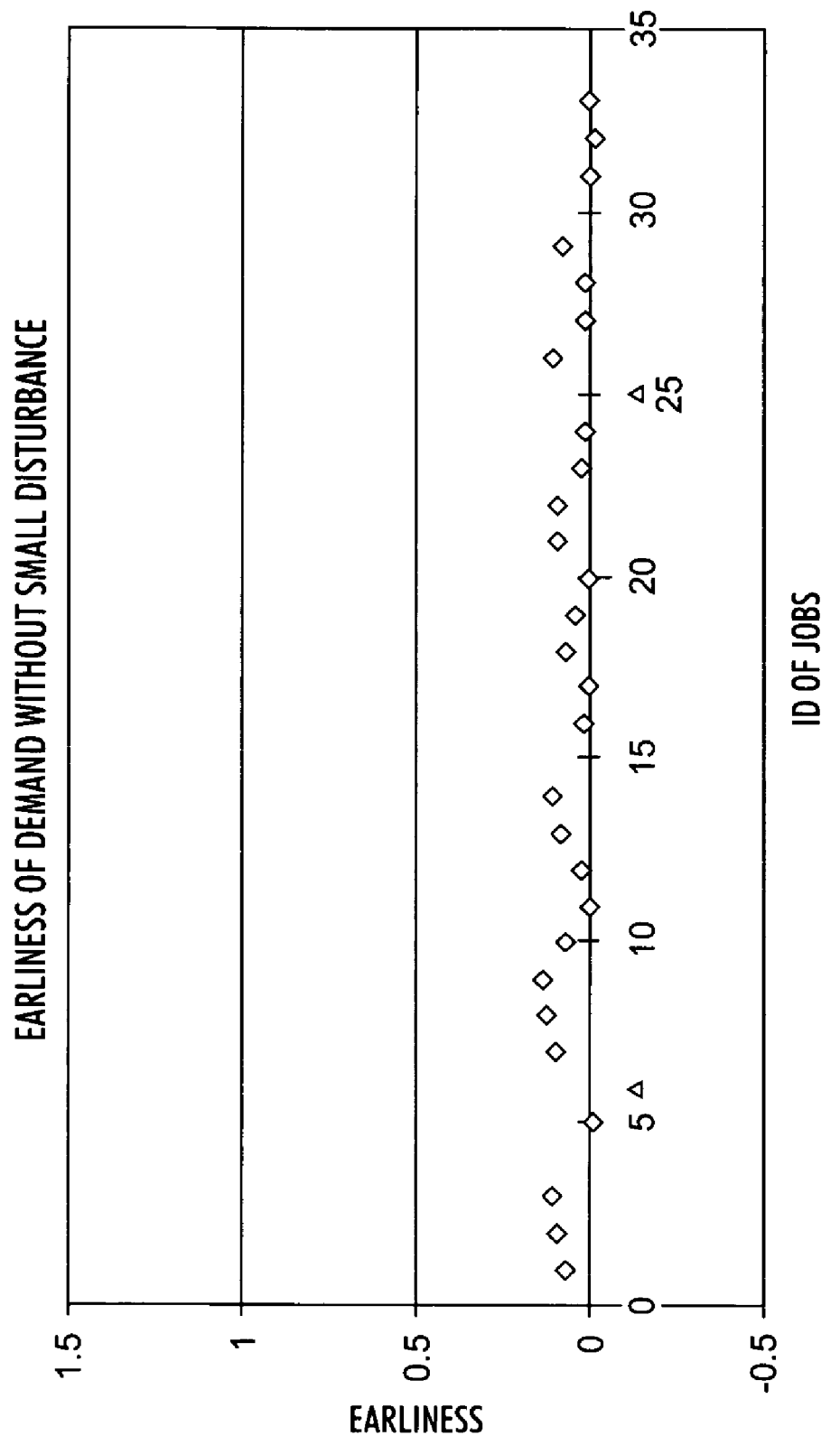
FIG. 8 is an earliness plot including points for both regular jobs and disturbance jobs with small takt-rate.
Figure 9:
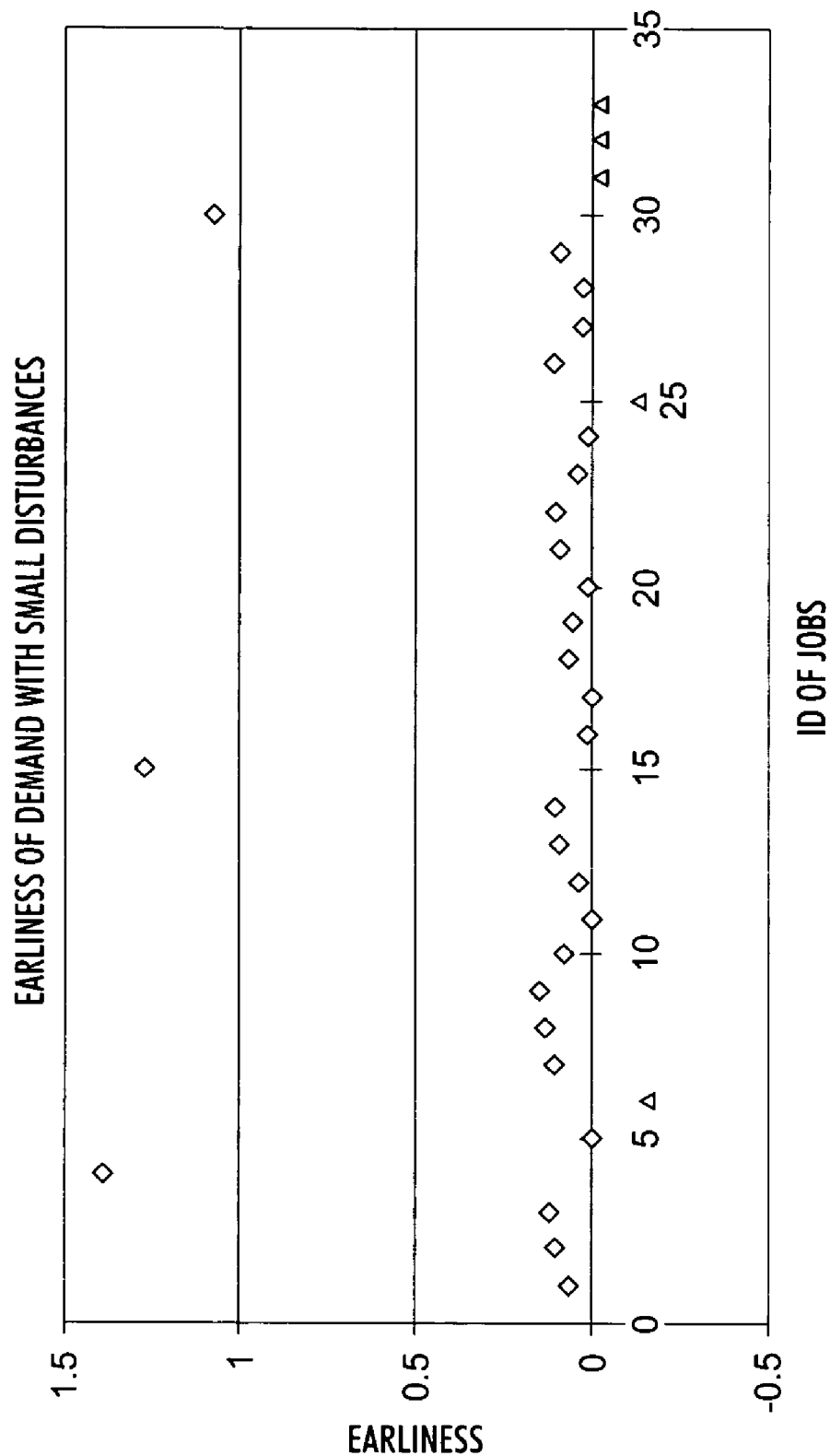
FIG. 9 is an earliness plot for the jobs shown in FIG. 8 without the disturbance jobs.

Part II: The following observations regarding the above-mentioned lateness pattern are made to further illustrate the effect of disturbance on late jobs, and a "hedge ratio (an indicator identifying the disturbance)" is introduced. Referring to FIG. 8, the earliness values of Table 2 are plotted—the points corresponding with the late jobs are distinguished, by triangle shapes, from the points corresponding with the early or on-time jobs. Referring to FIG. 9, a plot showing simulation results without the effect of disturbance is provided.

Analysis of the plots of FIGS. 8 and 9 reveal that:

1. Compared to other jobs, the earliness of disturbance jobs is very large. Since the SRPT rule generally schedules the jobs with smallest processing time, it follows that each disturbance job will be processed once it arrives. Then the earliness of these jobs will be approximately equal to its due slack, which is relatively large. From a statistical view, the disturbance jobs cause a large CV of earliness.
2. Before the last three late jobs in Table 2, there is a disturbance job with large earliness. If this disturbance job is removed, then, as shown in FIG. 9, three jobs will be on time. Referring specifically to the bottom of Table 2, the lateness of the last three jobs, 0.0081, 0.0145, 0.0118, are smaller than the processing time of job #30, which is 0.01909. By removing job #30, it would appear that the due horizon can be shifted and 0.01909 time slack created for the following jobs. However, how much time slack can really add to the following jobs depends on their arrival times. In the event of the removal of job #30 (at t=4.96), job #31 will not arrive until t=4.96328. Therefore, the effective time slack created is (0.01909−(4.96328−4.96))=0.01581. This number is still larger than the lateness of the last three jobs. Therefore, the opportunity exists to make each one of the last jobs on time by rescheduling (e.g., delaying the scheduling of job #30 until a selected condition is met).

Figure 10:
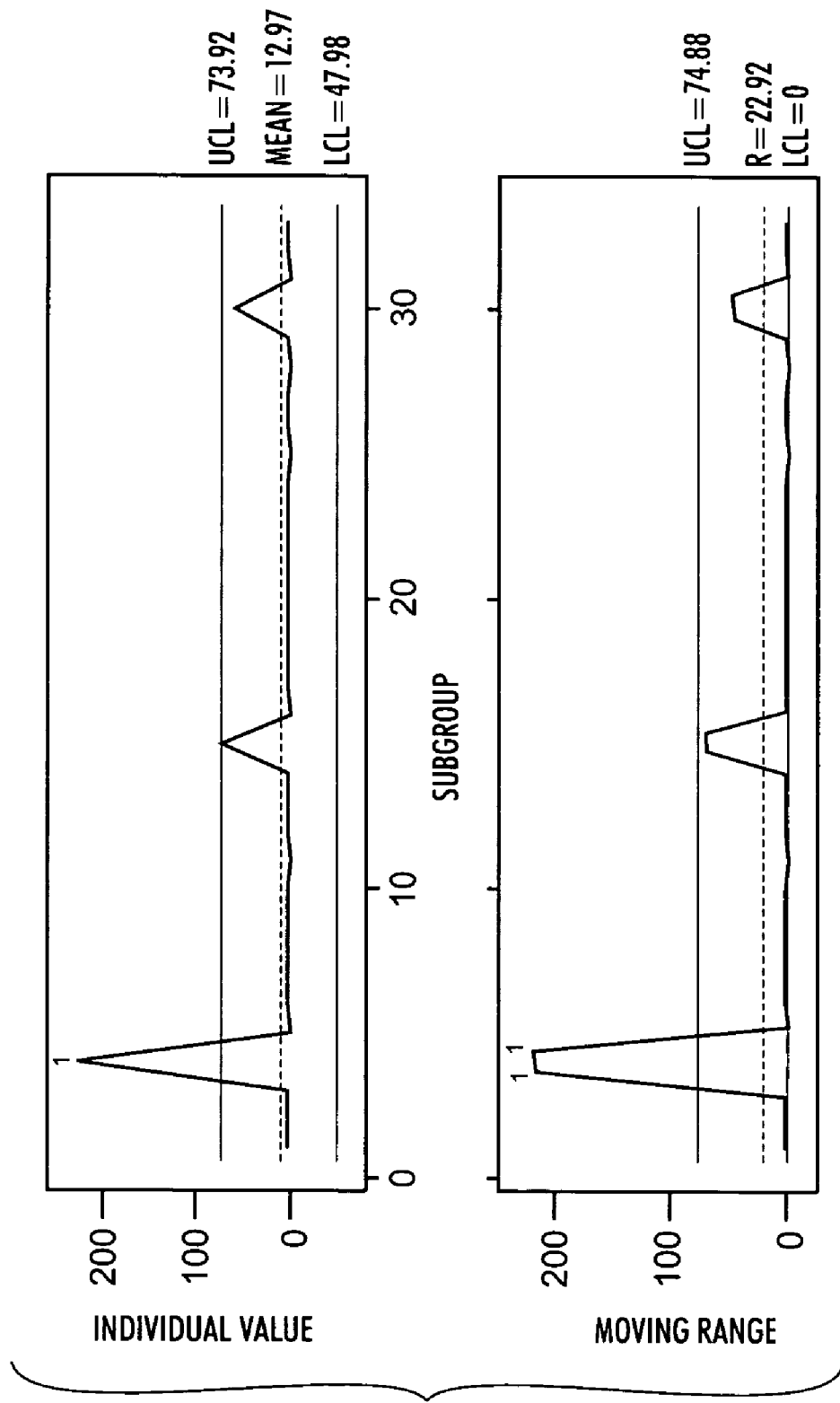
FIG. 10 is an Individual and Moving Range (I-MR) charts for hedge ratios, the hedge ratios corresponding respectively with the jobs plotted in FIG. 8.

The above description shows that, under certain conditions, the lateness of some jobs may be attributed to the job with large earliness. Additionally, these late jobs could be on time if the disturbance jobs are eliminated or rescheduled. Thus, it has been found helpful to identify the disturbance jobs based on a control chart. Referring to FIG. 10, an individual/moving range (I-MR) chart of hedge ratio for the jobs of Table 2 is plotted. It should be noted that the instantaneous hedge ratio is proportional to the inverse of instantaneous takt-rate. In particular, the hedge ratio is the inverse of takt-rate time the processing rate of the associated equipment. Hence, as described in further detail below, hedge ratio, takt-rate, or a combination of the two, can be used (in conjunction with a threshold or control limit) to suitably reschedule disturbance jobs.

Part III: To better schedule the demand with disturbance, it has been found that one effective approach is to control the hedge ratio, that is, to reduce the variability of release hedge ratio in a job queue. Referring to the example of FIG. 11, a hedge ratio filter, designated by the numeral 100, is used to smooth the release hedge ratio, and when the instantaneous hedge ratio for a given job is smaller than a threshold value s, the job is released to a job queue 102. A job having a hedge ratio greater than the threshold value s is hedged before the filter, and, as time elapses, the instantaneous hedge ratio decreases gradually. When the instantaneous hedge ratio drops below the threshold value, the job is released. Each job passing the filter (or each disturbance job that is "released") is queued and then waits for the scheduling subsystem 104 for scheduling in accordance with the SRPT or similarly suited scheduling rule. The instantaneous hedge ratios of the jobs in the job queue are controlled, i.e. the instantaneous hedge ratio CV of the job queue is reduced.

Figure 11:
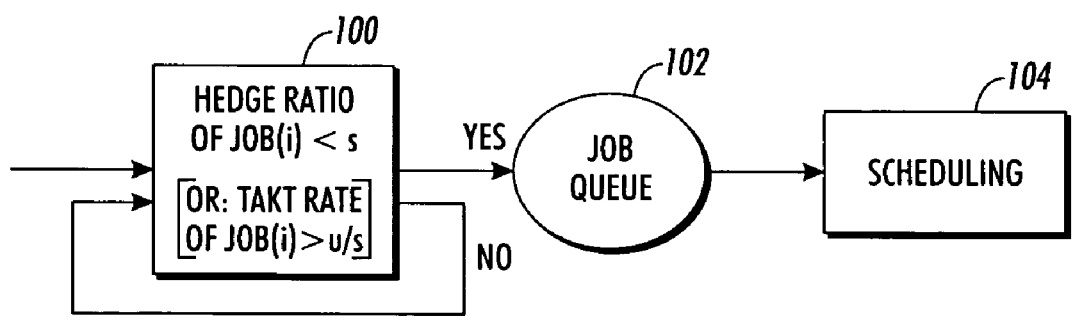
FIG. 11 is a diagrammatic illustration of a scheduling subsystem including a hedge ratio filter.

It should now be apparent that the hedge ratio based implementation of FIG. 11 could alternatively be implemented as a takt-rate (or inverted hedge ratio) based filter. In the takt-rate based alternative, the takt-rate based filter would determine whether the takt-rate of each job (which is provided, for example, in Table 2) is below a selected threshold value. The selected threshold value, in one example, might be determined on the basis of a "lower control limit (LCL)" calculated from the job distribution of Table 2. As indicated in U.S. Pat. No. 6,961,732 to Hellemann et al, the pertinent portions of which are incorporated herein by reference, the LCL is generally minus three standard deviations from the mean. It is understood that, under certain circumstances, it might not be feasible to set the selected threshold value with a takt rate control chart. In this event, the takt-rate based threshold could be determined by inverting the hedge ratio threshold value obtained by way of the optimization described below.

In the takt-rate based alternative, each job with a Takt-rate greater than a selected threshold would pass the filter, and each disturbance job (i.e., each job having a takt-rate less than the selected threshold) would be held before the filter until its takt-rate exceeded the selected threshold. In one exemplary approach, a takt-rate based filter could be implemented with a filter inverting the instantaneous hedge ratio, and using a threshold of u/s.

Figure 12:
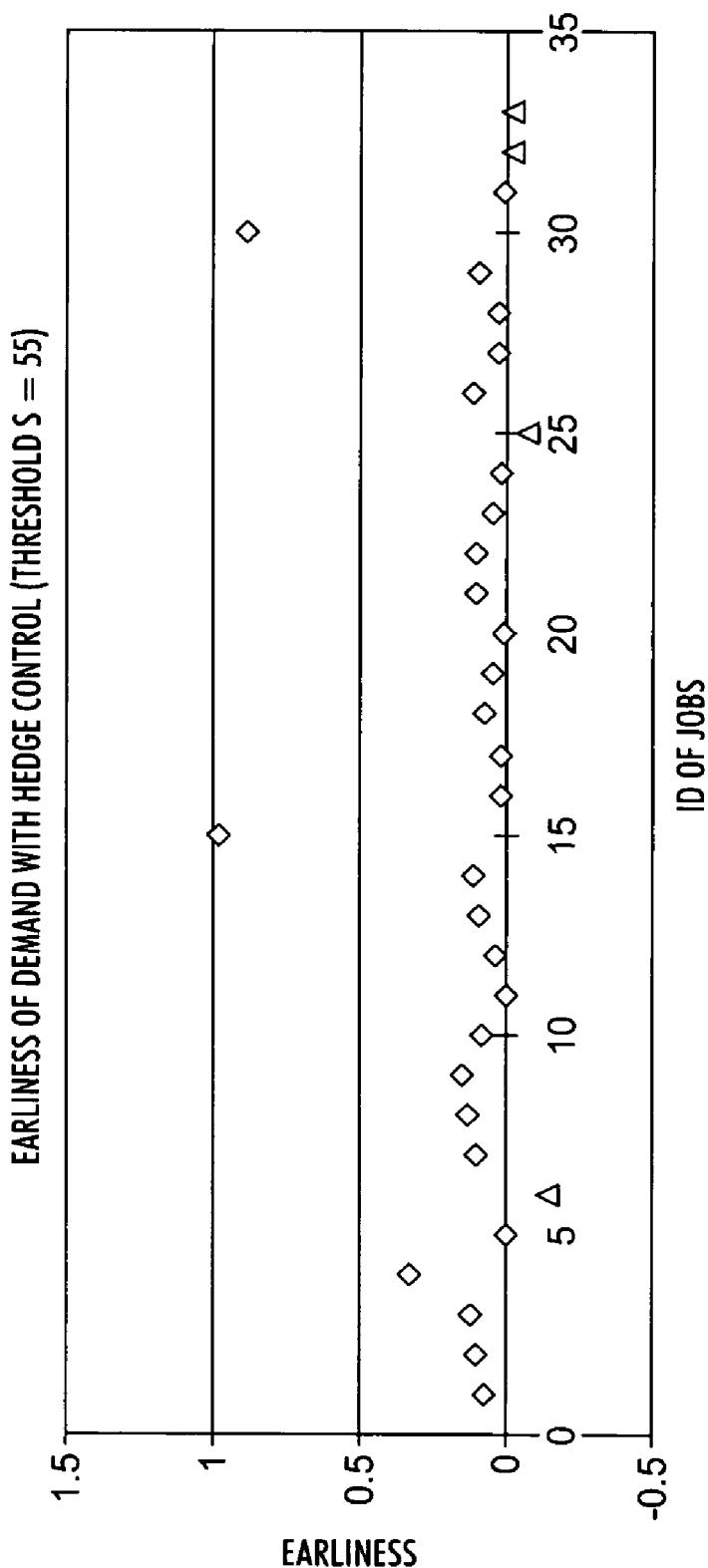
FIG. 12 is a plot of points for a hedge threshold optimization simulation in which the threshold value of the hedge ratio filter is set at 55.
Figure 13:
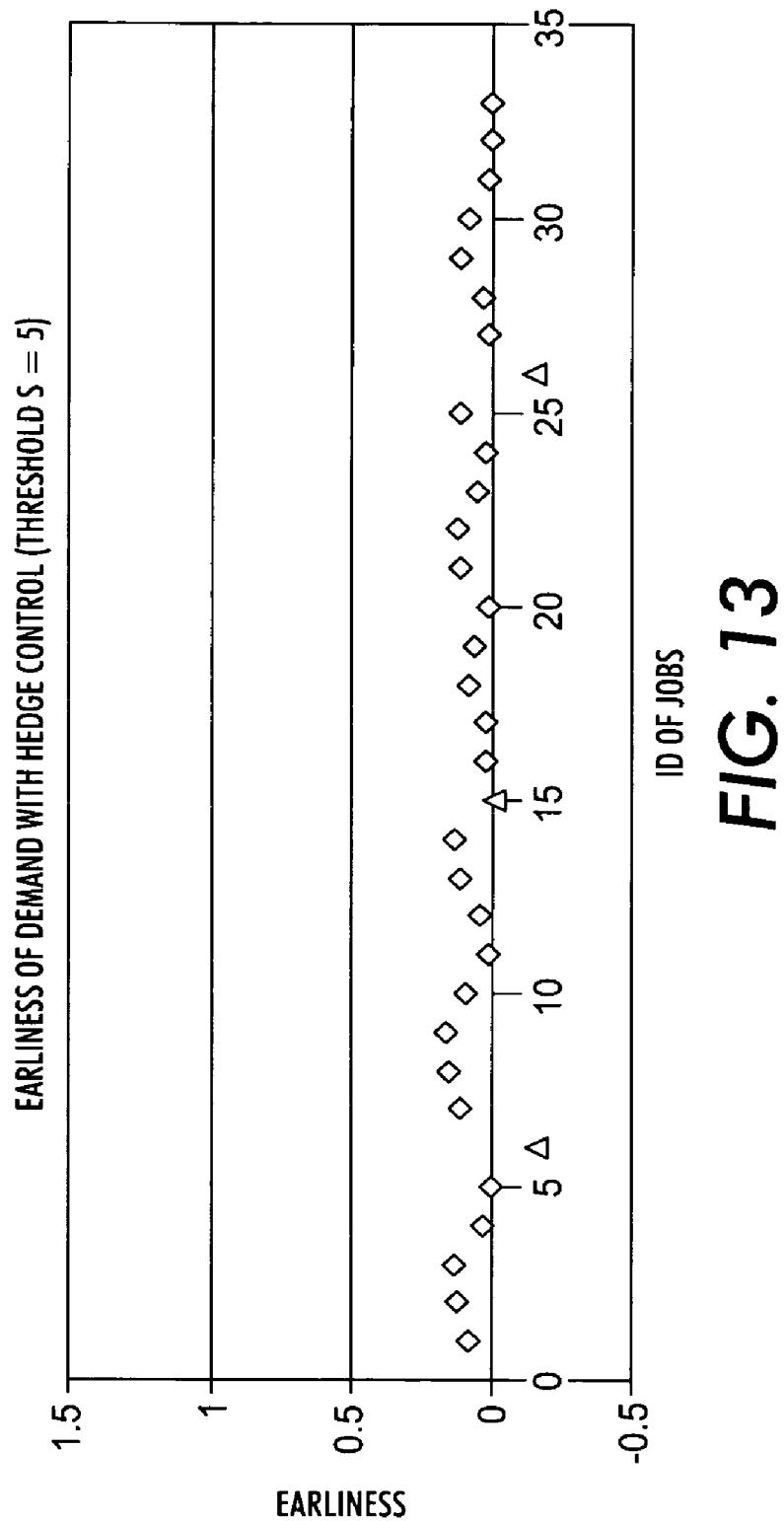
FIG. 13 is a plot of points for a hedge threshold optimization simulation in which the threshold value of the hedge ratio filter is set at 5.
Figure 14:
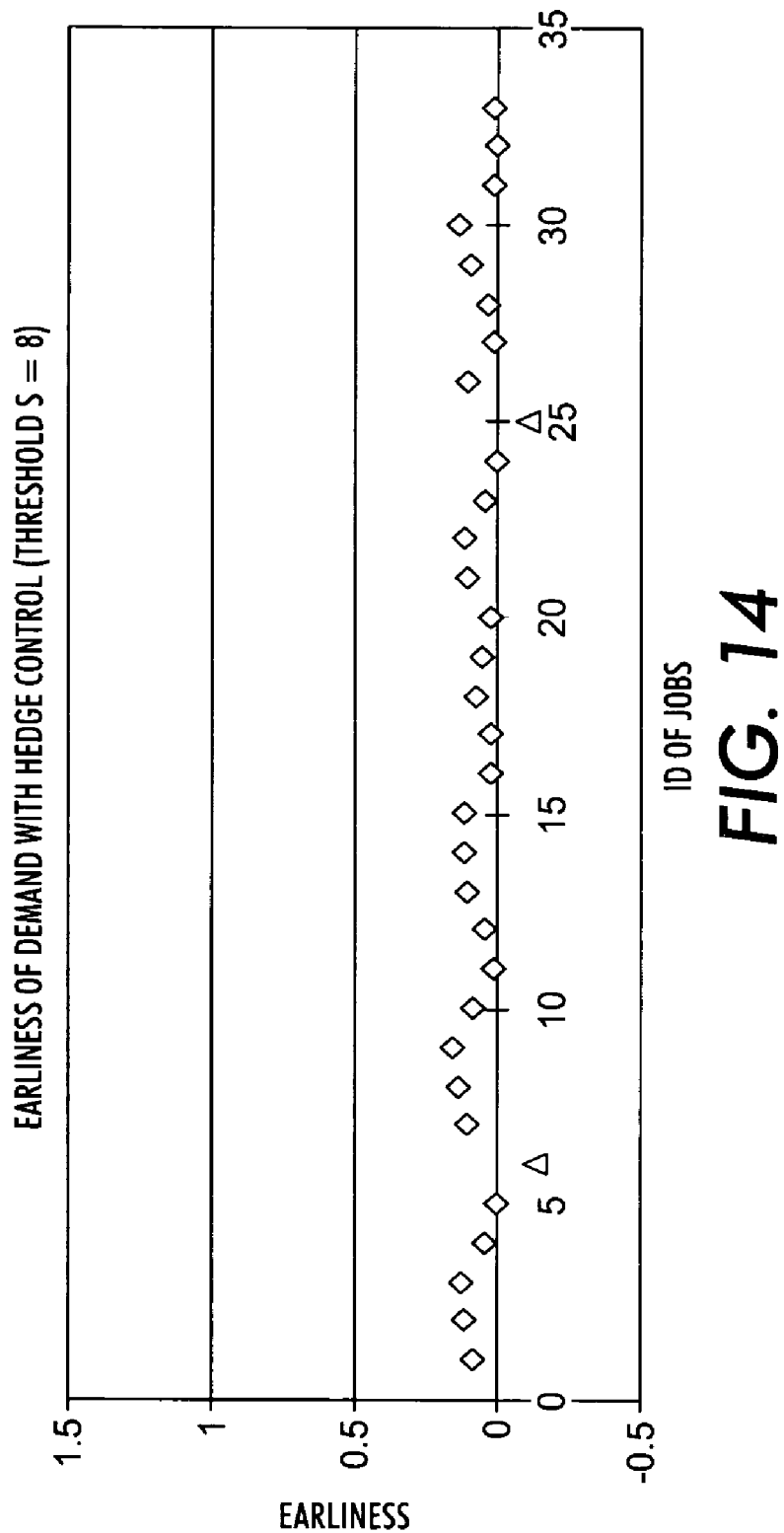
FIG. 14 is a plot of points for a hedge threshold optimization simulation in which the threshold value of the hedge ratio filter is set at 8.
Figure 16:
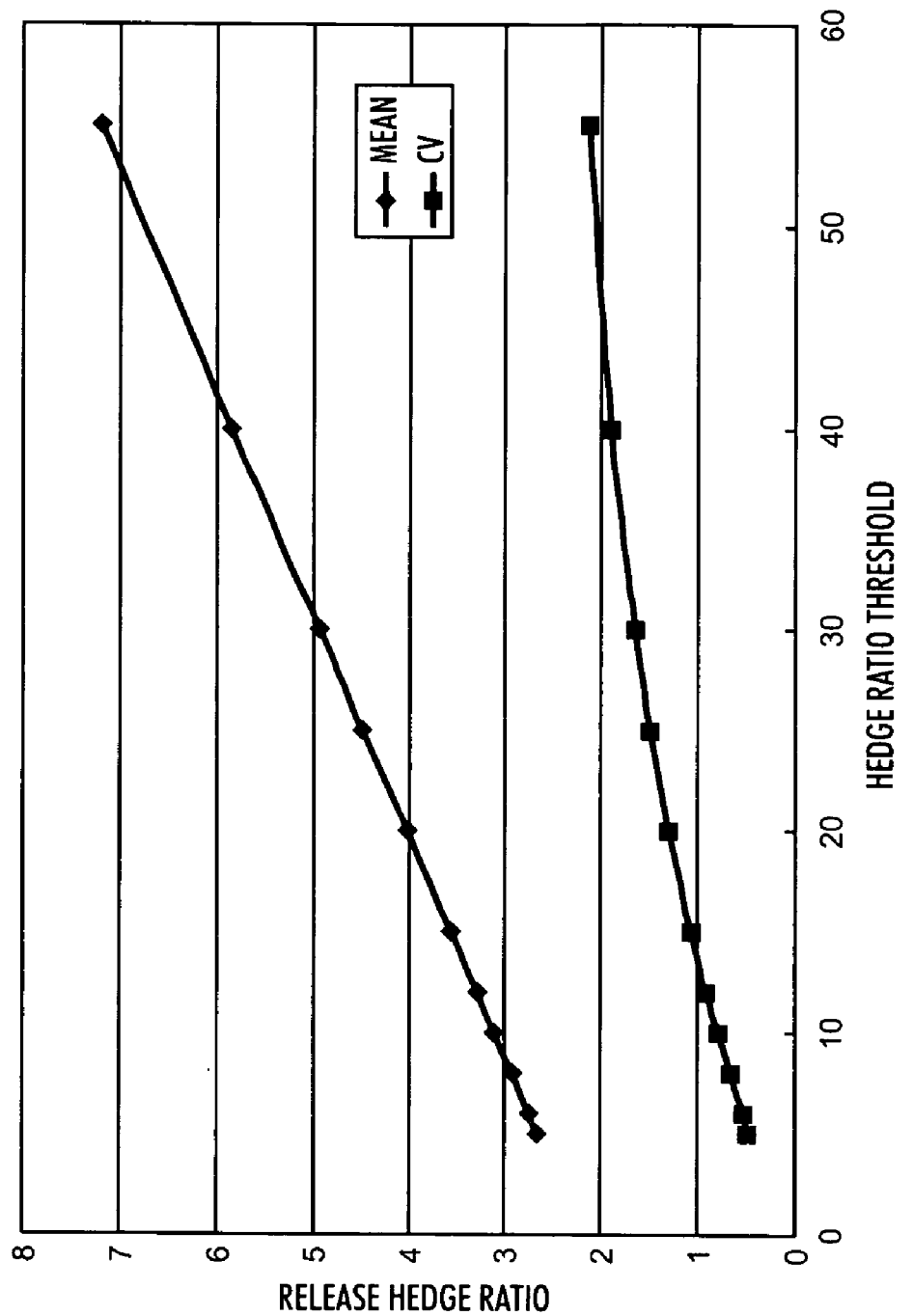
FIG. 16 is a plot (based on values from FIG. 15) of release hedge ratio mean and coefficient of variation (CV)

Referring still to FIG. 11, one of the design parameters of the filter 100 includes the threshold value of the hedge ratio (s). To optimize the value of s, three scenarios, having the respective case values of 55, 5 and 8, are considered. The results of simulations using these three case values are provided in the accompanying FIGS. 12-14:

The following three scenarios were observed by reference to FIGS. 12-14:

When threshold is large (s=55), the number of late jobs (i.e., the jobs having negative earliness values) is 5. Only job #31 is rescheduled to be on-time.

When threshold is small (s=5), the number of late jobs is 3. One of the late jobs is job #15, which is a disturbance job. This disturbance job was hedged too late to get on time.

When threshold is moderate (s=8), the number of late jobs is 2, the same as the case without disturbance. Therefore, the hedge control has completely eliminated the negative effect on the regular jobs.

Based on these three observed scenarios, it follows that there exists an optimal range of hedge ratio threshold value in the middle which could not only eliminate or minimize the negative effects on the regular jobs caused by the disturbance jobs, but could also make the small takt-rate disturbance jobs on time. Referring to FIG. 15, the impact of hedge ratio threshold, release due slack statistics, and release hedge ratio statistics on different scenarios is shown.

Figure 17:
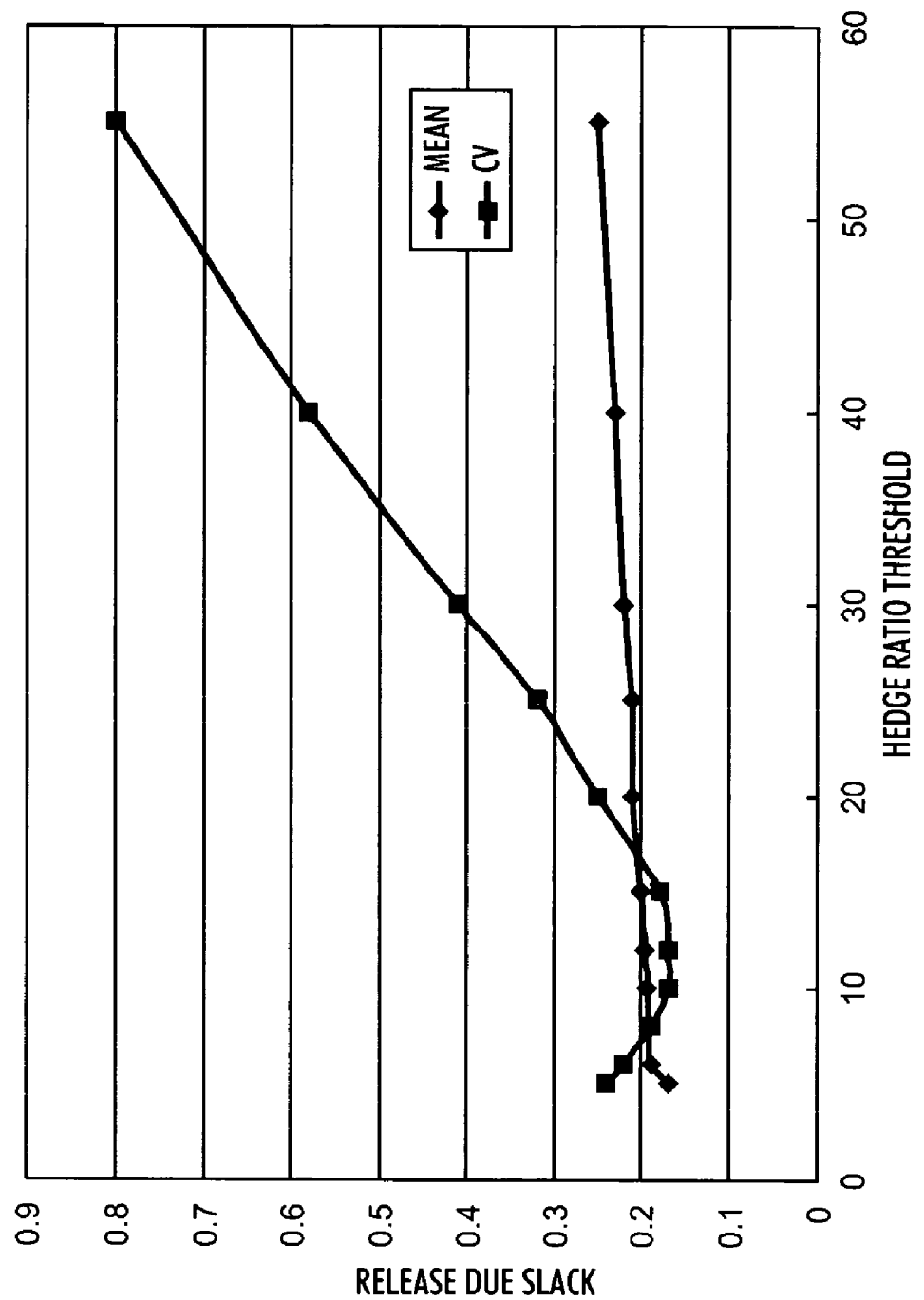
FIG. 17 is a plot (based on values from FIG. 15) of release due slack mean and CV.

With continued reference to FIG. 15, demand "without disturbance" gives the lower bound of release hedge ratio mean while demand "with disturbance but no hedge control" gives the upper bound of release hedge ratio and release due slack mean. When hedge ratio control is implemented, the smaller the threshold, the smaller the mean and coefficient of variation (CV) of release hedge ratio (FIG. 16); however, CV of release due slack will first decrease and then increase (FIG. 17). This is because the mean of release due slack decreases with threshold and even below the mean of due slack in the scenario without disturbance. Since smaller due slack will decrease on-time percentage, the mean of release due slack should be kept close to the value for the no disturbance scenario, and the release due slack CV should be minimized. In FIG. 15, s=8-12 appears to be the approximate optimal range. A threshold value above this range will cause regular jobs to be late, while a threshold below this range will affect the on-time performance of disturbance jobs. As indicated above, it may be desirable, under certain circumstances, to set the threshold value for takt-rate based filter, by using the inverse of the optimized hedge ratio threshold (along with a value for machine speed).

This above description discloses an efficient approach for diagnosing demand with disturbance, a situation that is widely presented in document production (as well as in a wide variety of other production related situations). As disclosed, an effective hedge control policy can be used to eliminate the negative effect of disturbance and maximize the on-time percentage of jobs. The threshold value can be optimized, as discussed above, so that negative effects on regular jobs, caused by disturbance jobs, are eliminated, and small takt-rate disturbance jobs can be made on time.

In addition to and in conjunction with the features of the disclosed embodiments disclosed, taught and/or suggested above, the following features are worth noting:

- Due slack or instantaneous due slack (the difference between due time and current time) can be used to determine which one or ones of a plurality of jobs comprise a disturbance job.
- Each job may be associated with an indicator of timeliness of execution (such as an earliness or lateness value) and the indicators may be used to designate, from a plurality of jobs (e.g., document jobs), which one or ones of the jobs include at least one disturbance job.
- A filter can be advantageously used to cause the scheduling of at least one disturbance job to be delayed until a production related value (such as a previously defined hedge ratio or takt-rate) is either less or greater than a selected threshold.
- Operation of the filter may be optimized by suitable selection of a threshold or threshold range. In one example the selecting includes corresponding threshold values with statistical parameters relating to both release hedge ratio and release due slack.
- The disclosed embodiments can be used advantageously in the context of a document production environment (such as a print shop) as well as a wide variety of other production settings (such as a pharmaceutical manufacturing facility).

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A system for managing a scheduling of a plurality of print jobs for a print shop, comprising:
    a memory for buffering the plurality of print jobs;
    a scheduling subsystem, operably connected to and communicating with said memory, for,
        (a) scheduling each of the plurality of print jobs for processing unless at least one of the plurality of print jobs is determined to be a disturbance job, wherein a disturbance job is defined as a print job having a small size when compared to an average size of the plurality of print jobs and a large due slack when compared to an average due slack of the plurality of print jobs, and wherein due slack equals a difference between a due time and a reference time, the at least one disturbance job causing delays in processing of other print jobs in the plurality of jobs that would not occur but for the existence of the at least one disturbance job among the plurality of print jobs, and
        (b) assigning a print job processing related value to the at least one disturbance job, the print job processing related value increasing over time, the at least one disturbance job having a size and being associated with a number of production hours available to execute the at least one disturbance job, wherein the print job processing related value for the at least one disturbance job varies as a function of print job size and number of hours available to execute the at least one disturbance job; and
    a filter, operably connected to and communicating with the scheduling subsystem for causing the scheduling of the at least one disturbance job to be delayed until the print job processing related value exceeds a selected threshold value such that, when the print job processing related value is less than the selected threshold, the at least one disturbance job is scheduled for processing by the scheduling subsystem and placed in a jobs queue.

2. A system for managing a scheduling of a plurality of document jobs in a document production environment, comprising:
    a memory for buffering the plurality of document jobs;
    a scheduling system operably connected to and communicating with the memory, said scheduling system,
        (a) scheduling each of the plurality of document jobs for processing unless at least one of the plurality of document jobs is determined to be a disturbance job, wherein a disturbance job is defined as a print job having a small size when compared to an average size of the plurality of print jobs and a large due slack when compared to an average due slack of the plurality of print jobs, and wherein due slack equals a difference between a due time and a reference time, the at least one disturbance job causing delays in processing of other document jobs in the plurality of jobs that would not occur but for the existence of the at least one disturbance job among the plurality of document jobs, and
        (b) assigning a document job processing related value to the at least one disturbance job, the document job processing related value increasing over time, the at least one disturbance job having a size and being associated with a number of production hours available to execute the at least one disturbance job, wherein the print job processing related value for the at least one disturbance job varies as a function of print job size and number of hours available to execute the at least one disturbance job, and (c) delaying scheduling of the at least one disturbance job until the document job processing related value exceeds a selected threshold value such that, when the print job processing related value is less than the selected threshold, the at least one disturbance job is scheduled for processing by the scheduling subsystem and placed in a jobs queue.

3. The document management system of claim 2, wherein the document production environment comprises a printshop, and each document job includes a print related instruction.

4. The document job management system of claim 2, in which each of the plurality of document jobs includes a document job processing related value, wherein the selected threshold value is set with the respective document processing related values of the plurality of document jobs.

5. The document job management system of claim 2, wherein said scheduling subsystem includes a filter and said filter causes the scheduling of the at least one disturbance job to be delayed until the document job processing related value exceeds the selected threshold value.

6. The document job management system of claim 5, wherein the selected threshold value is selected in such a way as to optimize the operation of said filter.

7. The document job management system of claim 2, in which the due time for execution of each document job in the plurality of document jobs is provided, wherein due slack is used to determine which one or ones of the plurality of document jobs comprise the at least one disturbance job.

8. The document job management system of claim 7, wherein the selected threshold value is set with due slack.

9. The document job management system of claim 2, wherein said scheduling subsystem uses one of a plurality of scheduling rules to schedule each of the plurality of document jobs for processing.

10. The document job management system of claim 2, in which each one of the plurality of document jobs is respectively associated with a document job processing related value, wherein an existence of at least one disturbance job among the plurality of document jobs is determined by comparing the document job processing related value of each job with the selected threshold value.

11. A method for managing the scheduling of a plurality of jobs, comprising:
    obtaining, by a processing device, a job input stream including the plurality of jobs;
    scheduling, by a processing device, each of the plurality of jobs for processing unless at least one of the plurality of jobs is determined to be a disturbance job, wherein a disturbance job is defined as a print job having a small size when compared to an average size of the plurality of print jobs and a large due slack when compared to an average due slack of the plurality of print jobs, and wherein due slack equals a difference between a due time and a reference time, the at least one disturbance job causing delays in processing of other jobs in the plurality of jobs that would not occur but for the existence of the at least one disturbance job in the job input stream;
    assigning, by a processing device, a processing related value to the at least one disturbance job, the processing related value increasing over time, the at least one disturbance job having a size and being associated with a number of production hours available to execute the at least one disturbance job, wherein the print job processing related value for the at least one disturbance job varies as a function of print job size and number of hours available to execute the at least one disturbance job; and
    delaying, by a processing device, scheduling of the at least one disturbance job until the processing related value exceeds a selected threshold value such that, when the print job processing related value is less than the selected threshold, the at least one disturbance job is scheduled for processing by the scheduling subsystem and placed in a jobs queue.

12. The method of claim 11, wherein said providing comprises providing a job input stream including a plurality of document jobs, at least one of the plurality of document jobs including a set of image data and instructions for processing prints to be made from the set of image data.

13. The method of claim 11, in which each of the plurality of document jobs includes a document job processing related value, further comprising setting the selected threshold value with the respective document processing related values of the plurality of document jobs.

14. The method of claim 11, in which the due time for execution of each job in the plurality of jobs is provided, further comprising using the due slack of each job to determine which one or ones of the plurality of jobs comprise the at least one disturbance job.

15. The method of claim 14, further comprising setting the selected threshold value with due slack.

16. The method of claim 11, in which each job is associated with an earliness or lateness value, the earliness or lateness value reflecting the timeliness of execution for each job, further comprising selecting the selected threshold value from one of at least two different threshold values in such a way that the respective earliness or lateness values for the plurality of jobs are optimized.

17. The method of claim 11, wherein said scheduling includes scheduling each of the plurality of the jobs with one of a plurality of scheduling rules.

18. The method of claim 17, wherein said scheduling includes scheduling each of the plurality of jobs with a shortest-remaining-processing-time rule.

19. The method of claim 11, in which each one of the plurality of document jobs is respectively associated with a processing related value, further comprising determining an existence of at least one disturbance job among the plurality of jobs by comparing the processing related value of each job with the selected threshold value.

\* \* \* \* \*